(12) United States Patent
Han et al.

(10) Patent No.: US 12,200,353 B2
(45) Date of Patent: Jan. 14, 2025

(54) ELECTRONIC DEVICE AND METHOD FOR PROVIDING POSITION AND SHOOTING INFORMATION FOR RECOMMENDING IMAGE CAPTURING PLACE

(71) Applicant: Samsung Electronics Co., Ltd., Suwon-si (KR)

(72) Inventors: Jonghyun Han, Suwon-si (KR); Ochae Kwon, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 17/421,504

(22) PCT Filed: Jan. 8, 2020

(86) PCT No.: PCT/KR2020/000326
§ 371 (c)(1),
(2) Date: Jul. 8, 2021

(87) PCT Pub. No.: WO2020/145653
PCT Pub. Date: Jul. 16, 2020

(65) Prior Publication Data
US 2022/0094845 A1    Mar. 24, 2022

(30) Foreign Application Priority Data
Jan. 9, 2019    (KR) .................. 10-2019-0002963

(51) Int. Cl.
*H04N 23/60*    (2023.01)
*G09G 3/20*    (2006.01)
(Continued)

(52) U.S. Cl.
CPC ........... *H04N 23/64* (2023.01); *G09G 3/2092* (2013.01); *H04M 1/72457* (2021.01);
(Continued)

(58) Field of Classification Search
CPC ...... H04N 23/64; H04N 7/183; H04N 23/661; H04N 23/57; G09G 3/2092;
(Continued)

(56) References Cited

U.S. PATENT DOCUMENTS 8,301,159 B2 * 10/2012 Hamynen ........ H04N 21/25841
455/456.2
2004/0189829 A1 * 9/2004 Fukuda ................ H04N 23/634
348/E5.042
(Continued)

FOREIGN PATENT DOCUMENTS

JP    2010-208566 A    9/2010
KR    10-2015-0134960 A    12/2015
(Continued)

OTHER PUBLICATIONS

Extended European Search Report dated Feb. 7, 2022, issued in a counterpart European Application No. 20738137.7.
(Continued)

*Primary Examiner* — Usman A Khan
(74) *Attorney, Agent, or Firm* — Jefferson IP Law, LLP

(57) ABSTRACT

An electronic device is provided. The electronic device includes a communication module, a display, and a processor, wherein the processor determines position information of the electronic device, controls the communication module to transmit the position information of the electronic device to a server, controls the communication module to acquire, from the server, at least one image identified based on the position information of the electronic device and position information associated with the at least one image, controls the display to display the at least one image acquired from the server, acquires an input for a first image among the at least one image, and according to the input, controls the display to display a path corresponding to position informa-
(Continued)

tion corresponding to the first image and the position information of the electronic device.

15 Claims, 19 Drawing Sheets

(51) Int. Cl.
*H04M 1/72457* (2021.01)
*H04N 7/18* (2006.01)
*H04N 23/661* (2023.01)

(52) U.S. Cl.
CPC ............ *H04N 7/183* (2013.01); *H04N 23/661* (2023.01); *G09G 2340/12* (2013.01); *G09G 2354/00* (2013.01); *G09G 2370/04* (2013.01)

(58) Field of Classification Search
CPC ............ G09G 2340/12; G09G 2354/00; G09G 2370/04; H04M 1/72457; H04M 2250/52
USPC ..................................... 348/207.11
See application file for complete search history.

(56) References Cited

U.S. PATENT DOCUMENTS

| | | | |
|---|---|---|---|
| 2005/0172147 A1 | 8/2005 | Edwards et al. | |
| 2009/0171568 A1* | 7/2009 | McQuaide, Jr. | G01C 21/36 701/411 |
| 2011/0050909 A1* | 3/2011 | Ellenby | H04N 23/00 348/207.1 |
| 2011/0141141 A1* | 6/2011 | Kankainen | G01C 21/3647 348/E7.001 |
| 2011/0199479 A1* | 8/2011 | Waldman | H04N 23/633 701/533 |
| 2011/0314049 A1* | 12/2011 | Poirier | H04N 23/64 382/218 |
| 2013/0188061 A1* | 7/2013 | Ellenby | H04N 23/64 348/207.1 |
| 2013/0198176 A1* | 8/2013 | Kim | G06F 16/58 707/758 |
| 2013/0258117 A1* | 10/2013 | Penov | G06V 10/24 348/207.1 |
| 2015/0233724 A1* | 8/2015 | Lee | G06V 20/10 348/113 |
| 2016/0086025 A1* | 3/2016 | Shotton | G06V 20/695 382/103 |
| 2016/0142626 A1* | 5/2016 | Bostick | H04N 23/661 348/207.11 |
| 2016/0286132 A1* | 9/2016 | Kim | H04N 1/00307 |
| 2017/0208246 A1* | 7/2017 | Kimura | H04N 23/64 |
| 2018/0150961 A1 | 5/2018 | Senthamil | |
| 2018/0184240 A1 | 6/2018 | Yang et al. | |
| 2019/0320113 A1* | 10/2019 | Rajvanshi | H04N 23/64 |

FOREIGN PATENT DOCUMENTS

| | | |
|---|---|---|
| KR | 10-2017-0094030 A | 8/2017 |
| KR | 10-2017-0096711 A | 8/2017 |
| KR | 10-2018-0058461 A | 6/2018 |
| KR | 20180058461 A * | 6/2018 |
| KR | 10-2018-0101974 A | 9/2018 |

OTHER PUBLICATIONS

Korean Office Action dated May 18, 2023, issued in Korean Patent Application No. 10-2019-0002963.
European Office Action dated Jun. 14, 2023, issued in European Patent Application No. 20 738 137.7.
European Examination Report dated Jul. 22, 2024, issued in European Application No. 20738137.7.

* cited by examiner

ELECTRONIC DEVICE AND METHOD FOR PROVIDING POSITION AND SHOOTING INFORMATION FOR RECOMMENDING IMAGE CAPTURING PLACE

CROSS-REFERENCE TO RELATED APPLICATION(S)

This application is a U.S. National Stage application under 35 U.S.C. § 371 of an International application number PCT/KR2020/000326, filed on Jan. 8, 2020, which is based on and claims priority of a Korean patent application number 10-2019-0002963, filed on Jan. 9, 2019, in the Korean Intellectual Property Office, the disclosure of which is incorporated by reference herein in its entirety.

BACKGROUND

1. Field

The disclosure relates to an electronic device that recommends an image capturing place, and a method of operating the same.

2. Description of Related Art

A cloud server may receive images captured by electronic devices and may store the received images in a memory. The electronic devices may prevent unnecessary memory consumption by storing the images in the cloud server instead of storing the images in the memory of the electronic device.

In addition, when receiving an input for moving to a specific point from a user, the electronic device may provide a user interface that guides the user to the specific point based on position information of the electronic device. The user interface may be configured using an execution screen of a map application or a navigation screen.

The above information is presented as background information only to assist with an understanding of the disclosure. No determination has been made, and no assertion is made, as to whether any of the above might be applicable as prior art with regard to the disclosure.

SUMMARY

An electronic device that provides a general navigation function may provide a user interface that guides a user to a specific point. When a user wants to capture an image of a landmark, etc., associated with a corresponding point, the user may need to know a shooting point suitable for capturing the image, not a specific point, and may need to adjust a shot composition at a shooting position and configuration values for the hardware of the electronic device.

Aspects of the disclosure are to address at least the above-mentioned problems and/or disadvantages and to provide at least the advantages described below. Accordingly, an aspect of the disclosure is to provide an electronic device determining a shot composition and configuration values of hardware such as a gyro sensor, etc., and providing optimal shooting information to a user based on context information corresponding to a corresponding point.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a display, and a processor, wherein the processor may be configured to determine position information of the electronic device, control the communication module to transmit the position information of the electronic device to a server, control the communication module to acquire, from the server, at least one image determined based on the position information of the electronic device and position information associated with the at least one image, control the display to display the at least one image acquired from the server, acquire an input for a first image among the at least one image, and control the display to display the position information of the electronic device and a path corresponding to position information corresponding to the first image according to the input.

In accordance with another aspect of the disclosure, a method of controlling an electronic device is provided. The method includes determining position information of the electronic device, controlling a communication module to transmit the position information of the electronic device to a server, controlling the communication module to acquire, from the server, at least one image determined based on the position information of the electronic device and position information associated with the at least one image, controlling a display to display the at least one image acquired from the server, acquiring an input for a first image among the at least one image, and controlling the display to display the position information of the electronic device and a path corresponding to position information corresponding to the first image according to the input.

The server may acquire position information of an electronic device from the electronic device, acquire at least one image among a plurality of images based on the position information of the electronic device and position information corresponding to the plurality of images, acquire shooting information corresponding to the at least one image based on raw data associated with the at least one image and context information associated with the at least one image, and transmit the acquired shooting information to the electronic device.

According to various embodiments, it is possible to provide a position and shooting information suitable for capturing an image selected by a user and to provide guidance so that the user may capture a desired image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
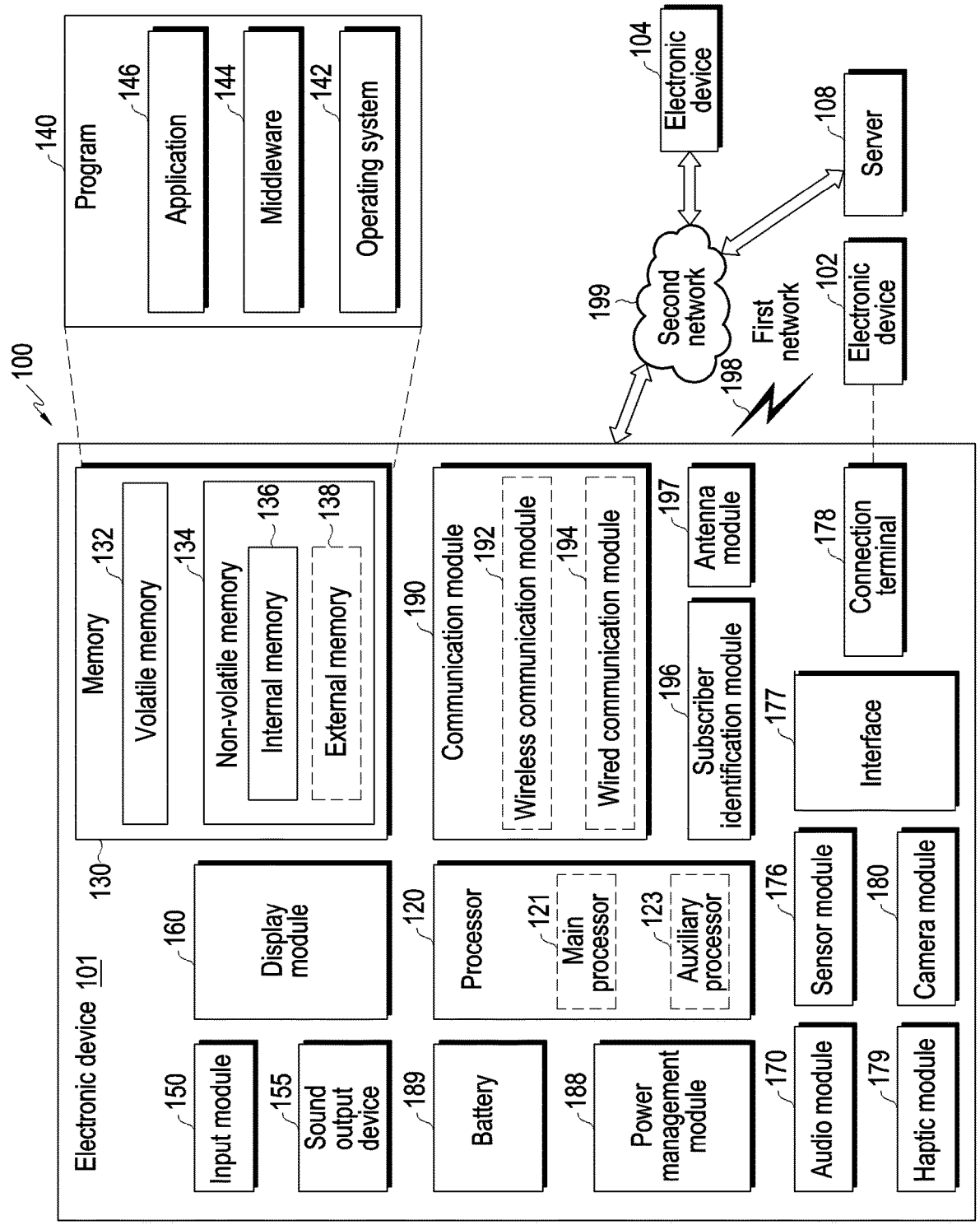
FIG. 1 is a diagram illustrating a network environment including an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
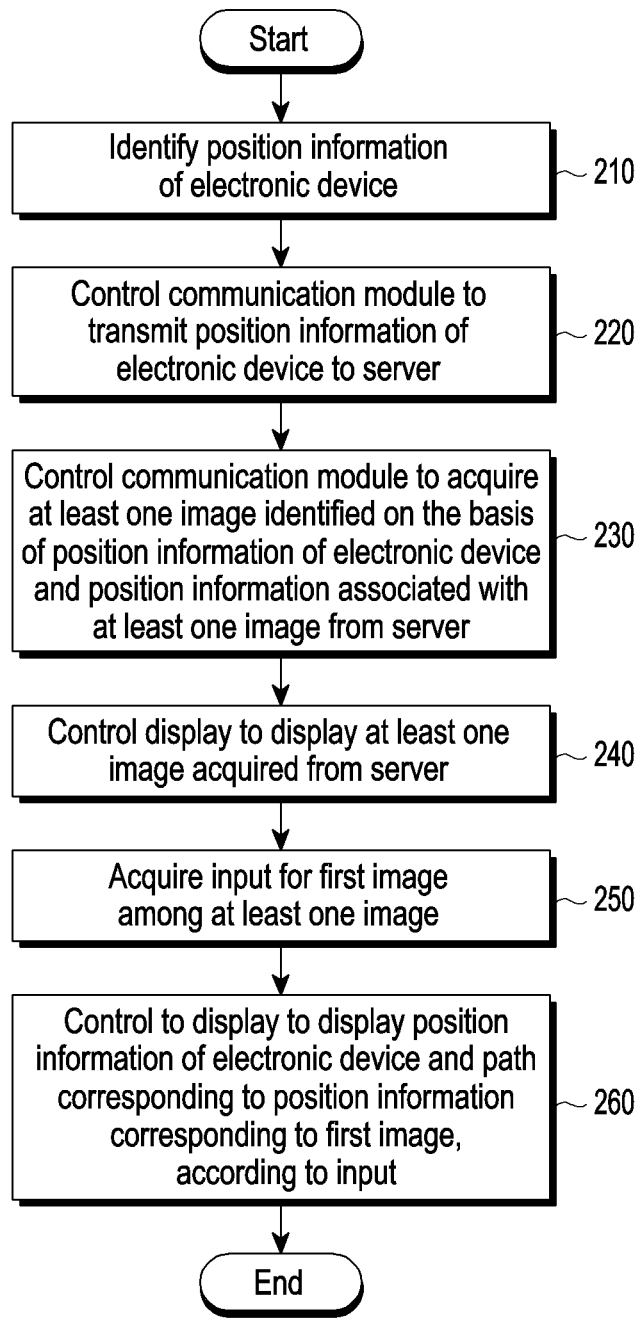
FIG. 2 is a flowchart illustrating a configuration in which an electronic device provides a shooting position for a first image, according to an embodiment of the disclosure.
Figure 3:
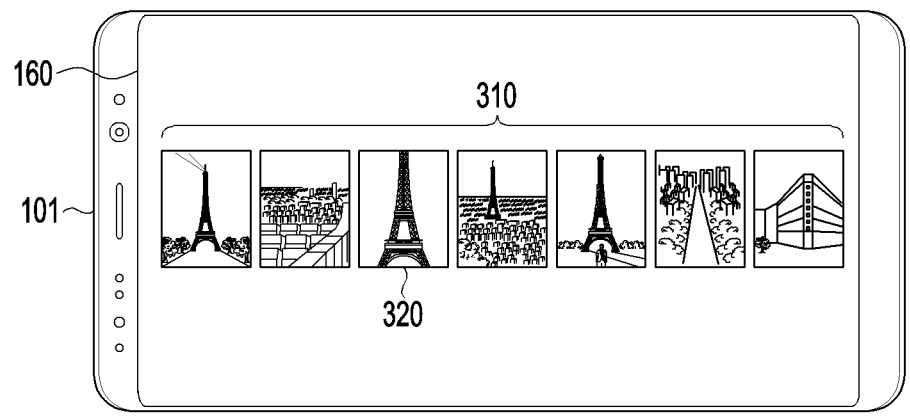
FIG. 3 is a flowchart illustrating a configuration in which an electronic device displays at least one image according to an embodiment of the disclosure.

FIG. 2 is a flowchart illustrating a configuration in which an electronic device provides a shooting position for a first image, according to an embodiment of the disclosure. FIG. 3 is a flowchart illustrating a configuration in which an electronic device displays at least one image according to an embodiment of the disclosure.

Referring to FIG. 2, in operation 210, a processor (e.g., the processor 120 of FIG. 1) of an electronic device (e.g., the electronic device 101 of FIG. 1) may determine position information of the electronic device. The electronic device 101 may control the communication module 190 to acquire a GPS signal and may determine the position of the electronic device based on the acquired GPS signal. Alternatively, the electronic device 101 may determine the position of the electronic device based on various methods such as a Wi-Fi based positioning system (WPS), but there is no limitation on a method of determining the position of the electronic device 101.

In operation 220, the processor 120 may control the communication module 190 to transmit the position information of the electronic device 101 to a server (e.g., the server 108 of FIG. 1). The processor 120 may control the communication module 190 to transmit the acquired GPS signal to the server 108 through a network (e.g., the network 199 of FIG. 1).

In operation 230, the processor 120 may control the communication module 190 to acquire at least one image determined on the basis of the position information of the electronic device 101 and position information associated with at least one image from the server 108. For example, the server 108 may determine at least one image corresponding to a certain range from the position information of the electronic device 101. The position information associated with the at least one image may include at least one of GPS information of a point where an object of the at least one image is located, GPS information of a point suitable for capturing the at least one image, or shooting information corresponding to the at least one image. Here, the GPS information of the point suitable for capturing the at least one image may include position information at which each of the at least one image is actually captured, or may be acquired on the basis of the actually captured position information. For example, each of the at least one image may include position information as metadata. Details of a process in which the server 108 acquires at least one image and a process of transmitting position information associated with at least one image to the electronic device 101 will be described with reference to FIG. 4.

In operation 240, the processor 120 may control a display (e.g., the display 160 of FIG. 1) to display at least one image acquired from the server 108. Referring to FIG. 3, the electronic device 101 may control the display 160 to display at least one image 310. The processor 120 may display the at least one image 310 using various types of applications. The application used to display the at least one image 310 may include a cloud server application, a social network service application, or a web browsing application capable of accessing a cloud service or social network service. The cloud server application and the social network service application are exemplary only, and do not limit the spirit of the present application.

The processor 120 may determine position information associated with the at least one image 310 together with the at least one image 310, and may display, for example, corresponding position information when any one image is selected. Since the position information associated with the at least one image 310 includes GPS coordinates of a point corresponding to the at least one image, GPS coordinates of a point suitable for capturing the at least one image, and shooting information, the user may determine the at least one image 310 displayed on an execution screen of the application to select a first image 320 to be captured, and may determine GPS information of a point corresponding to the first image 320 and GPS information of a point suitable for capturing the first image. In various embodiments, the processor 120 may display the position information associated with the at least one image 310 together with the at least one image 310, and in this case, the user may determine position information for each image. The position information may be provided in the form of, for example, text or point of interest (POI) on a map, but there is no limitation on the form of providing the position information.

Figure 4A:
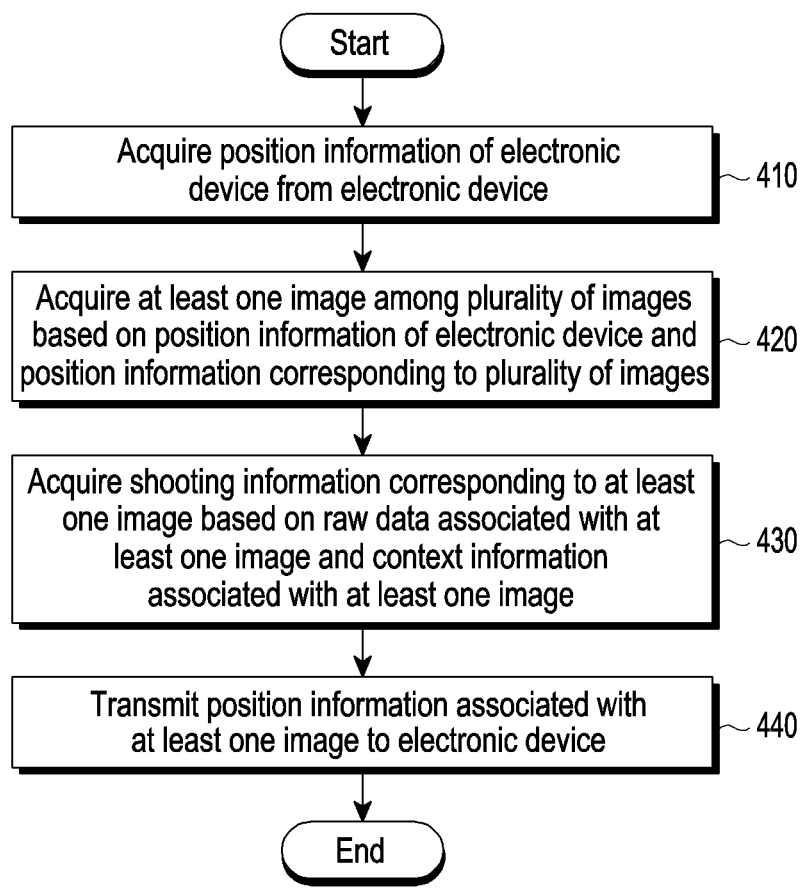
FIG. 4A is a flowchart illustrating a configuration in which a server transmits shooting information corresponding to at least one image to an electronic device, according to an embodiment of the disclosure.
Figure 4B:
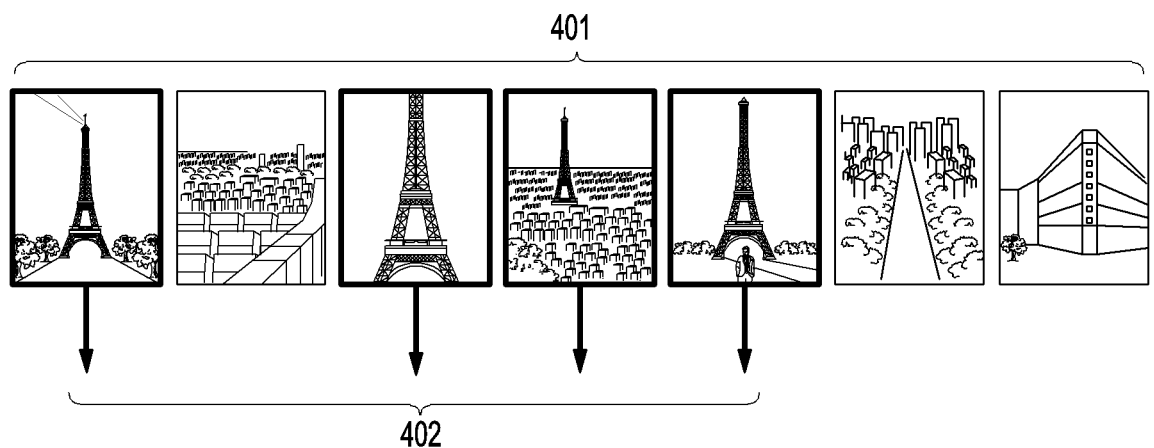
FIG. 4B is a diagram illustrating a configuration in which a server acquires at least one image from a plurality of images, according to an embodiment of the disclosure.
Figure 4C:
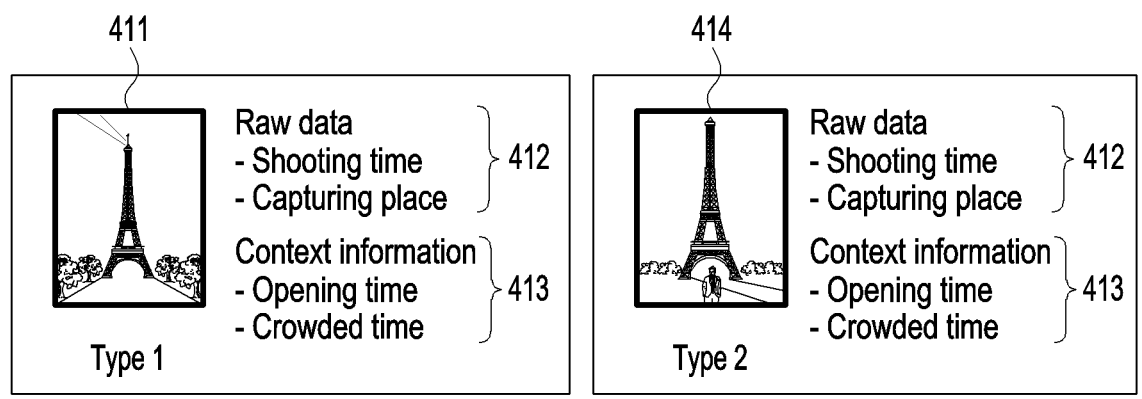
FIG. 4C is a diagram illustrating context information corresponding to at least one image, according to an embodiment of the disclosure.
Figure 4D:
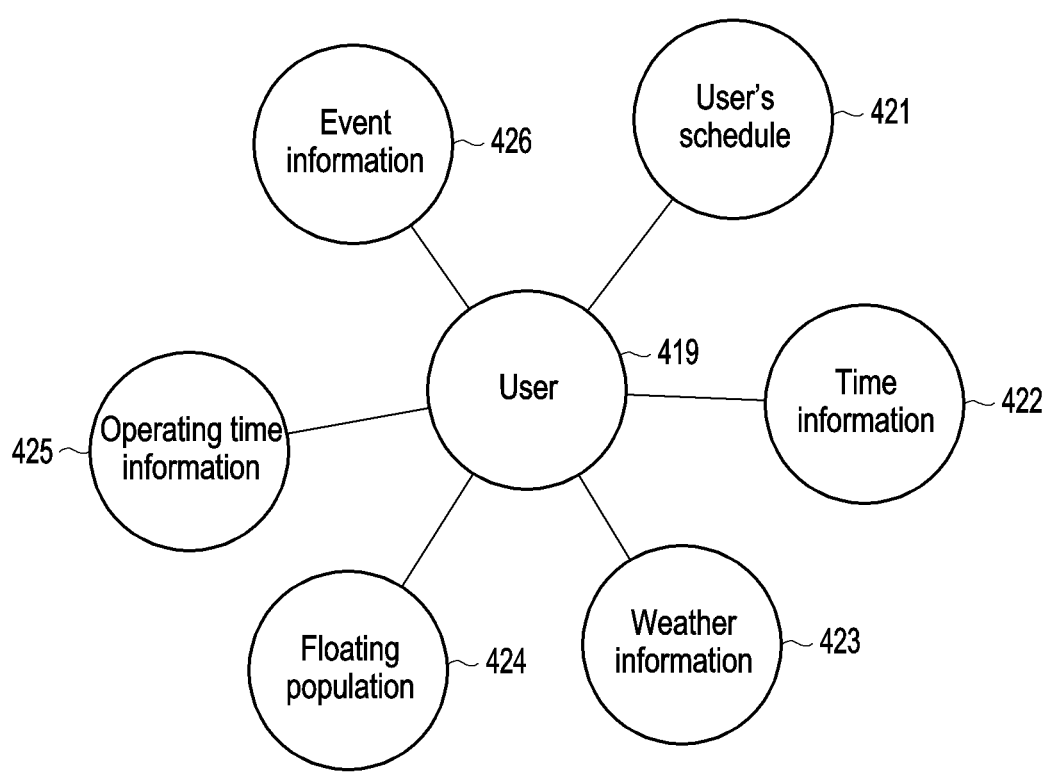
FIG. 4D is a diagram illustrating context information corresponding to at least one image, according to an embodiment of the disclosure.
Figure 4E:
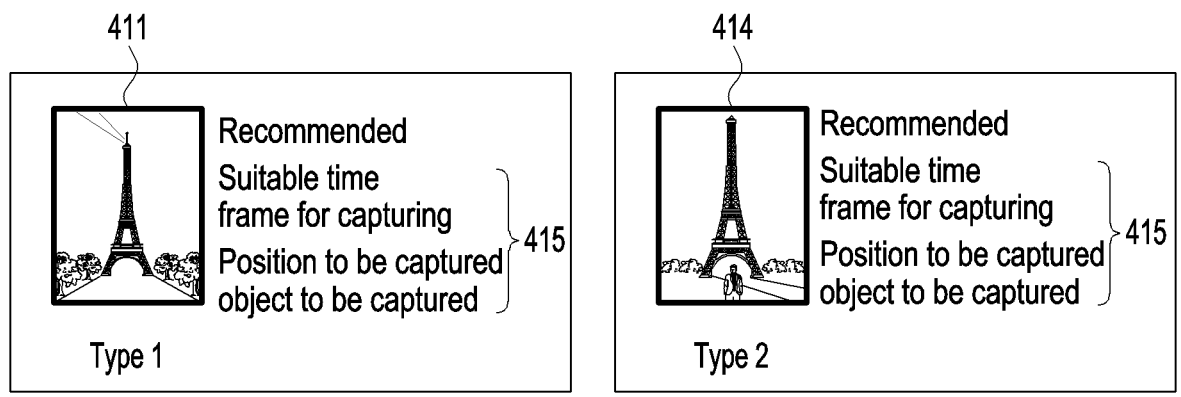
FIG. 4E is a diagram illustrating shooting information for at least one image according to an embodiment of the disclosure.

FIG. 4A is a flowchart illustrating a configuration in which a server transmits shooting information corresponding to at least one image to an electronic device, according to an embodiment of the disclosure. FIG. 4B is a diagram illustrating a configuration in which a server acquires at least one image from a plurality of images, according to an embodiment of the disclosure. FIG. 4C is a diagram illustrating context information corresponding to at least one image, according to an embodiment of the disclosure. FIG. 4D is a diagram illustrating context information corresponding to at least one image, according to an embodiment of the disclosure. FIG. 4E is a diagram illustrating shooting information for at least one image according to an embodiment of the disclosure.

Referring to FIG. 4A, in operation 410, a server (e.g., the server 108 of FIG. 1) may acquire position information of an electronic device (e.g., the electronic device 101 of FIG. 1) from the electronic device. The electronic device 101 may control a communication module (e.g., the communication module 190 of FIG. 1) to transmit GPS information of the electronic device 101, and the server 108 may determine the position of the electronic device 101 based on the GPS information acquired from the electronic device 101.

In operation 420, the server 108 may acquire at least one image among a plurality of images based on the position information of the electronic device 101 and position information associated with the plurality of images. Referring to FIG. 4B, the server 108 may acquire position information associated with a plurality of images 401 stored in the server 108, and may acquire at least one image 402 for at least one point around the electronic device 101. The standard of a distance at which the server 108 determines points around the electronic device 101 based on the position of the electronic device 101 may be a predetermined value. For example, the server 108 may determine the at least one image 402 corresponding to points within a reference distance (e.g., 5 km) from the position of the electronic device 101 from the plurality of images 401.

According to various embodiments, the server 108 may determine not only the position information of the electronic device 101 and the position information associated with the plurality of images 401, but also results obtained by analyzing the plurality of images 401, thereby acquiring the at least one image 402. For example, the server 108 may determine objects included in the plurality of images 401, and may determine the at least one image 401 corresponding to the most captured objects among images corresponding to points within a reference distance from the electronic device 101.

In operation 430, the server 108 may acquire shooting information corresponding to the at least one image based on raw data corresponding to the at least one image and context information associated with the at least one image. The server 108 may acquire GPS coordinates for a point suitable for capturing at least one image based on the acquired shooting information. Referring to FIG. 4C, the server 108 may determine raw data 412 and context information 413 for images 411 and 414 for the same object (e.g., the Eiffel Tower). For example, the raw data 412 may include a time at which a corresponding image is captured, a captured place, and the like. The server 108 may store a captured image, a time at which the corresponding image was captured, and GPS coordinates at the captured place, in a memory. The context information 413 may include information associated with a place where an image is captured, such as an opening time of a corresponding point and a time when the corresponding point is crowded.

According to various embodiments, referring to FIG. 4D, based on the user 419, the context information may include information 421 on a user's schedule, time information 422, weather information 423, information 424 related to a floating population at a point where an image was captured, operating time information 425 of a point where an image is captured, and information 426 on whether an event or festival is currently in progress at a point where an image was captured. The information 421 on the user's schedule may include information on a predetermined remaining travel time of the user, and the schedule may include various contents without limited to the travel, such as a user's schedule. The time information 422 may include information on daylight and sunset time based on the current time. The weather information 423 may include current weather information of a point where an image is captured and weather information of a time suitable for a user to capture an image. The information 424 related to the floating population at the point where the image was captured may include information on the floating population at the corresponding point at the current time. The operating time information 425 of the point at which the image was captured may include information on the opening time of the point at which the image was captured.

According to various embodiments, the server 108 may allocate priorities to the plurality of images 401 based on context information corresponding to the plurality of images 401. The server 108 may select images having higher priorities among the plurality of images 401 as the at least one image 402 based on the allocated priorities. Referring to FIG. 4E, the server 108 may acquire shooting information 415 corresponding to the at least one of the images 411 and 414 according to the selection result. The shooting information may include information on a composition and time suitable for capturing the at least one of the images 411 and 414, an object to be captured, the tilt of the electronic device, latitude, longitude, altitude coordinates, etc., and the server 108 may acquire GPS coordinates for a point suitable for capturing at least one image based on the acquired shooting information and may allow the acquired GPS coordinates to be included in position information associated with at least one image.

In operation 440, the server 108 may transmit the position information associated with at least one image to the electronic device 101. The server 108 may transmit the position information associated with at least one image together with the at least one image 402 through the network 199. The information associated with at least one image may include GPS coordinates of a point corresponding to at least one image, GPS coordinates of a point suitable for capturing at least one image, and shooting information. The electronic device 101 may control the communication module 190 to acquire the at least one image 402 and the position information associated with at least one image from the server 108.

Figure 5:
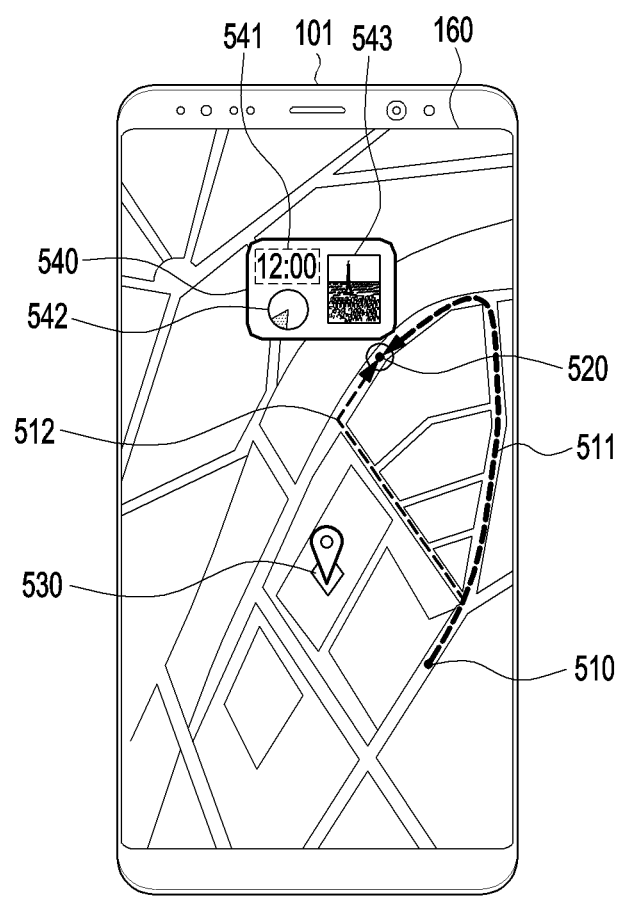
FIG. 5 is a diagram illustrating a configuration in which an electronic device displays a path based on position information corresponding to a first image, according to an embodiment of the disclosure.

FIG. 5 is a diagram illustrating a configuration in which an electronic device displays a path based on position information corresponding to a first image, according to an embodiment of the disclosure.

Referring to FIG. 2, in operation 250, the processor 120 may acquire an input for a first image among at least one image. The processor 120 may control a touch screen to receive a user input for selecting the first image 320 from among the at least one image 310. In operation 260, the processor 120 may control the display 160 to display a point corresponding to the position of the electronic device and a path indicating a point corresponding to a position suitable for capturing the first image according to the input. Referring to FIG. 5, upon receiving the input for selecting the first image 320, the processor 120 may control the display 160 to display a user interface guiding the user to the point suitable for capturing the first image. For example, the user interface may be an interface using an execution screen of a map application.

According to various embodiments, the processor 120 may control the display 160 to display a path leading from a user's current position 510 to a point 520 suitable for capturing the first image so that the user can capture an object 530 corresponding to the first image. As described above, since the shooting information is determined on the basis of the tilt, longitude, latitude, altitude coordinates, and gyro sensor values of the electronic device so that the user can capture the same image as the first image, coordinates of the position of the object 530 corresponding to the first image may be different from coordinates of the point 520 suitable for capturing the first image. The processor 120 may control the display 160 to display a mark 540 for the shooting information of the first image together with the mark of the point 520 suitable for capturing the first image. The mark 540 for the shooting information may include a shooting time 541 for capturing the first image, a shooting angle 542, and a thumbnail 543 of the first image.

According to various embodiments, the processor 120 may configure at least one path from a user's current position to a destination, and may select any one path among the at least one path and provide the selected path to the user so that the user can capture a corresponding image at an optimal position and angle. For example, the processor 120 may configure a first path 511 that is suitable for capturing an object corresponding to a first image as a path from the user's current position 510 to the point 520 suitable for capturing the first image, and a second path 512 that is the shortest path. The processor 120 may configure the first path 511 to have a priority so that the user can capture the object corresponding to the first image at an optimal position and angle instead of the second path 512, and may recommend the configured priority to the user. The processor 120 may determine that the first path 511 is suitable for the user to capture the first image compared to the second path 512 that is the shortest path based on the shot composition, and may configure the first path 511 to have a higher priority than the second path 512. According to the priority configuration result, the processor 120 may display a path so that the user can capture an image while moving along the first path 511, and may provide guidance.

Figure 6A:
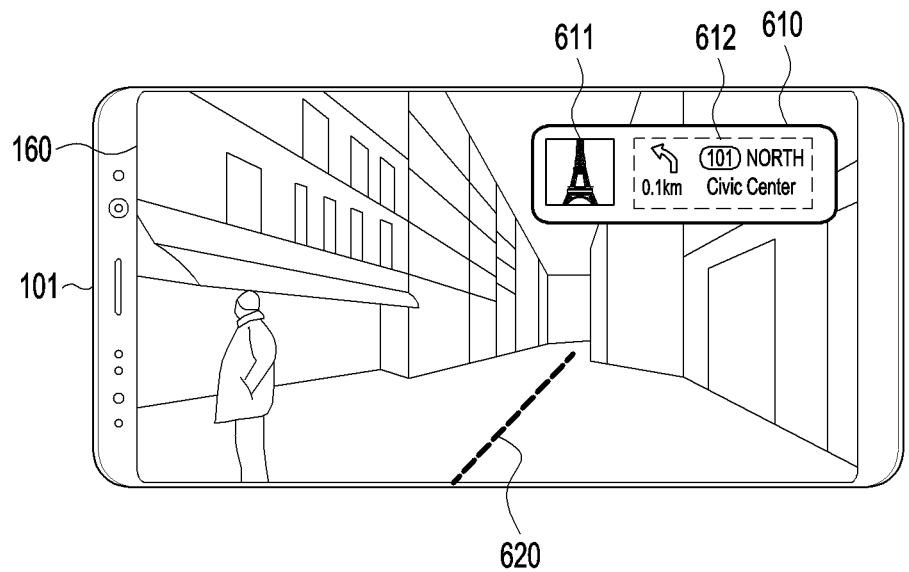
FIG. 6A is a diagram illustrating a configuration in which an electronic device displays a path using a simulation screen according to an embodiment of the disclosure.

FIG. 6A is a diagram illustrating a configuration in which an electronic device displays a path using a simulation screen according to an embodiment of the disclosure.

Referring to FIG. 6A, according to various embodiments, a processor (e.g., the processor 120 of FIG. 1) of the electronic device 101 may control the display 160 to display a corresponding path using a simulation screen. The simulation screen may be a simulation screen corresponding to a user's current position. When GPS coordinates of the electronic device 101 are changed according to the movement of a user holding the electronic device 101, the processor 120 may control the display 160 to display a simulation screen reflecting the change in the GPS coordinates. The processor 120 may control the display 160 to display a first direction indicator 610 and a second direction indicator 620 on the simulation screen corresponding to the user's current position. The first direction indicator 610 may include a thumbnail 611 for a first image and navigation information 612 for a path, and the second direction indicator 620 may be displayed on the ground of the simulation screen to show the path to the user.

Figure 6B:
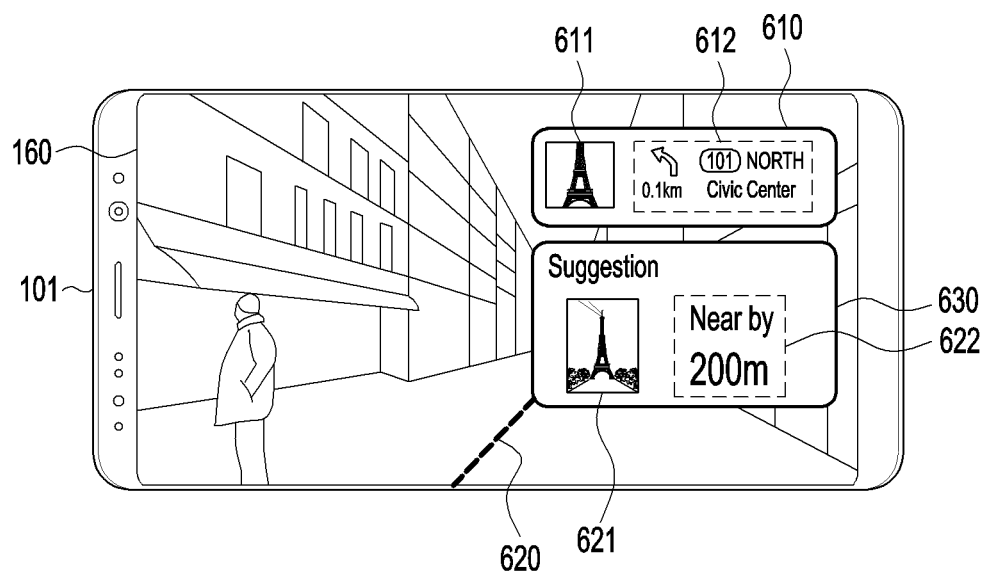
FIG. 6B is a diagram illustrating a configuration in which an electronic device displays a path using a simulation screen according to an embodiment of the disclosure.

FIG. 6B is a diagram illustrating a configuration in which an electronic device displays a path using a simulation screen according to an embodiment of the disclosure.

Referring to FIG. 6B, according to various embodiments, the processor 120 of the electronic device 101 may control the display 160 to display the first direction indicator 610 and the second direction indicator 620 on the simulation screen corresponding to the user's current position. In the same manner as in FIG. 6A, the first direction indicator 610 may include the thumbnail 611 for the first image and the navigation information 612 for the path. The processor 120 may control the display 160 to display a second image 621 of at least one image captured near the user's current position on the third direction indicator 630. The processor 120 may select an image having a high priority among the at least one image as the second image 621. A detailed description of the priorities has been described in detail with reference to FIGS. 4A to 4E, and thus will be omitted. The processor 120 may display the second image 621 and information 622 indicating a distance from the current position of the user on the third direction indicator 630.

Figure 7A:
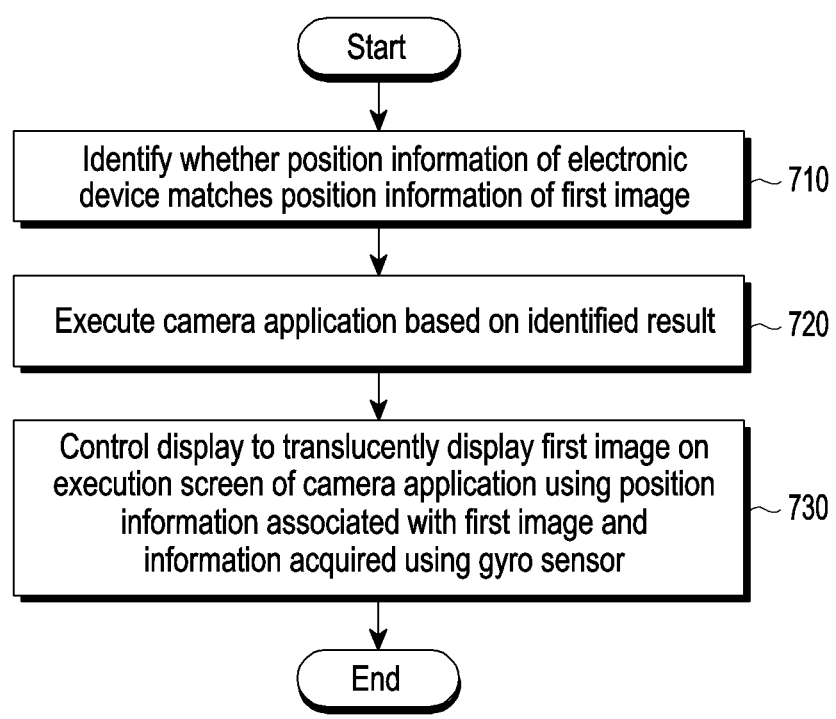
FIG. 7A is a flowchart illustrating a configuration in which an electronic device displays a first image on an execution screen of a camera application, according to an embodiment of the disclosure.
Figure 7B:
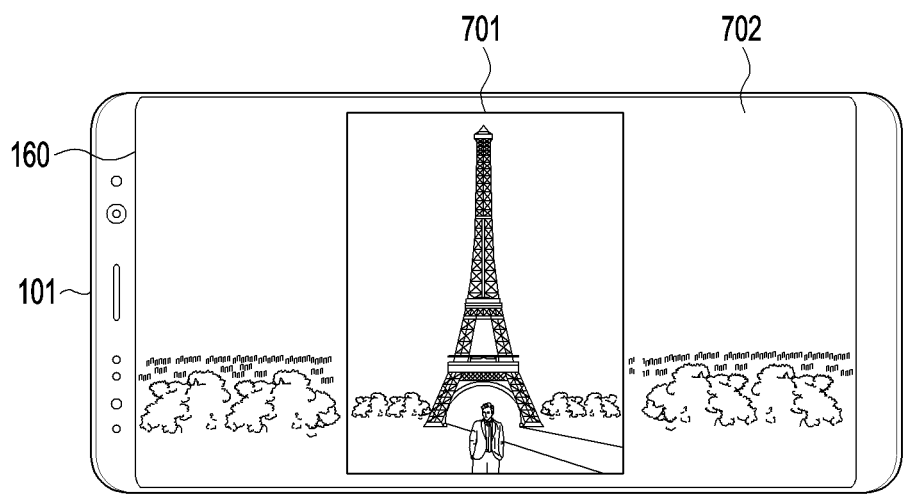
FIG. 7B is a diagram illustrating a configuration in which an electronic device displays a first image on an execution screen of a camera application, according to an embodiment of the disclosure.
Figure 7C:
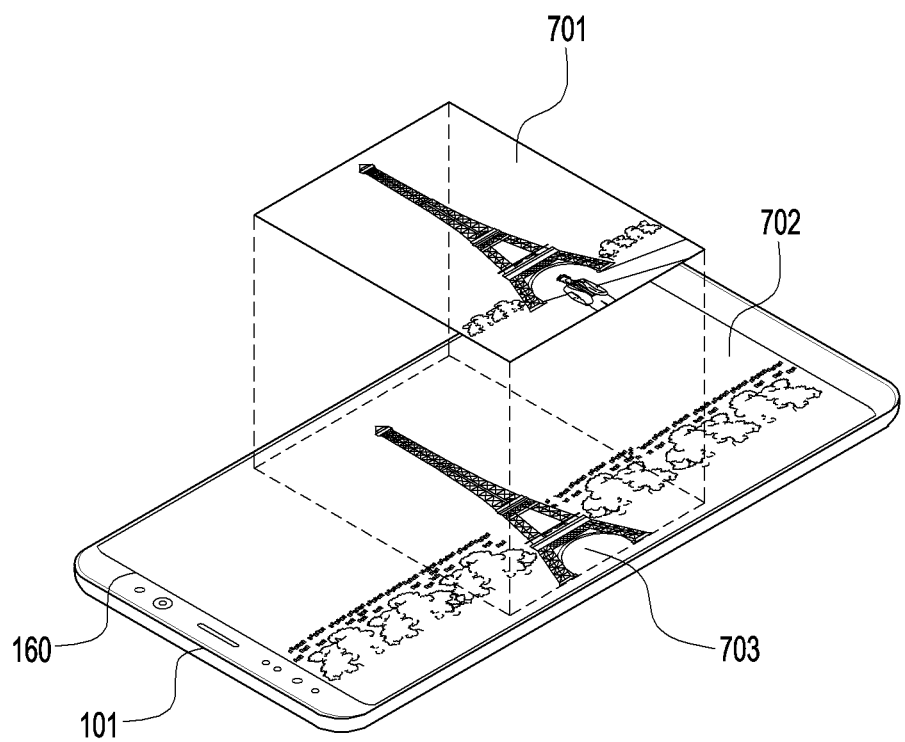
FIG. 7C is a diagram illustrating a configuration in which an electronic device displays a first image on an execution screen of a camera application, according to an embodiment of the disclosure.

FIG. 7A is a flowchart illustrating a configuration in which an electronic device displays a first image on an execution screen of a camera application, according to an embodiment of the disclosure. FIG. 7B is a diagram illustrating a configuration in which an electronic device displays a first image on an execution screen of a camera application, according to an embodiment of the disclosure. FIG. 7C is a diagram illustrating a configuration in which an electronic device displays a first image on an execution screen of a camera application, according to an embodiment of the disclosure.

Referring to FIG. 7A, in operation 710, the processor 120 of the electronic device 101 may determine whether the position information of the electronic device 101 matches position information of a point suitable for capturing the first image. For example, the processor 120 may determine whether GPS coordinates of the electronic device 101 matches GPS coordinates of the point suitable for capturing the first image. The position information associated with the first image received from the server 108 by the processor 120 may include shooting information corresponding to the first image, and the shooting information may include information on the GPS coordinates of the point suitable for capturing the first image. The processor 120 may compare the GPS coordinates of the electronic device 101 and the GPS coordinates of the point suitable for capturing the first image, and may determine whether the GPS information of the electronic device 101 matches the GPS coordinates of the point suitable for capturing the first image.

In operation 720, the processor 120 may execute a camera application based on the determination result. When the GPS information of the electronic device 101 matches the GPS information included in the shooting information, the processor 120 may execute the camera application, and when the GPS information of the electronic device 101 does not match the GPS information included in the shooting information, the processor 120 may continue to show the corresponding path.

In operation 730, the processor 120 may translucently display the first image on the execution screen of the camera application using position information associated with the first image and information acquired using a gyro sensor. As described in operation 430, the shooting information corresponding to the first image may include GPS coordinates enabling the user of the gyro sensor to obtain the same image, the tilt, longitude, latitude, altitude coordinates, and gyro sensor values of the electronic device. Referring to FIG. 7B, the processor 120 may control the display 160 to translucently display the first image 701 on the execution screen of the camera application so that the user can capture the same image as the first image at the GPS coordinates of the point suitable for capturing the first image by using the gyro sensor mounted in the electronic device 101. Referring to FIG. 7C, the processor 120 of the electronic device 101 may display an execution screen 702 of the camera application on a first layer, may display the first image 701 on a second layer, and may overlap and display the second layer on the first layer. For example, the user may acquire an image corresponding to the first image by capturing an object 703 displayed on the execution screen of the camera application to overlap the first image 701 displayed on the display 160. For example, the user of the electronic device 101 may allow a gyro value included in the shooting information to match a gyro value acquired using the gyro sensor mounted on the electronic device 101, thereby acquiring an image corresponding to the first image. The processor 120 may adjust parameters of the camera application so that the captured image may have the first image and the size, brightness, composition, contrast, and filter value of a corresponding image as well as the gyro sensor value.

Figure 8A:
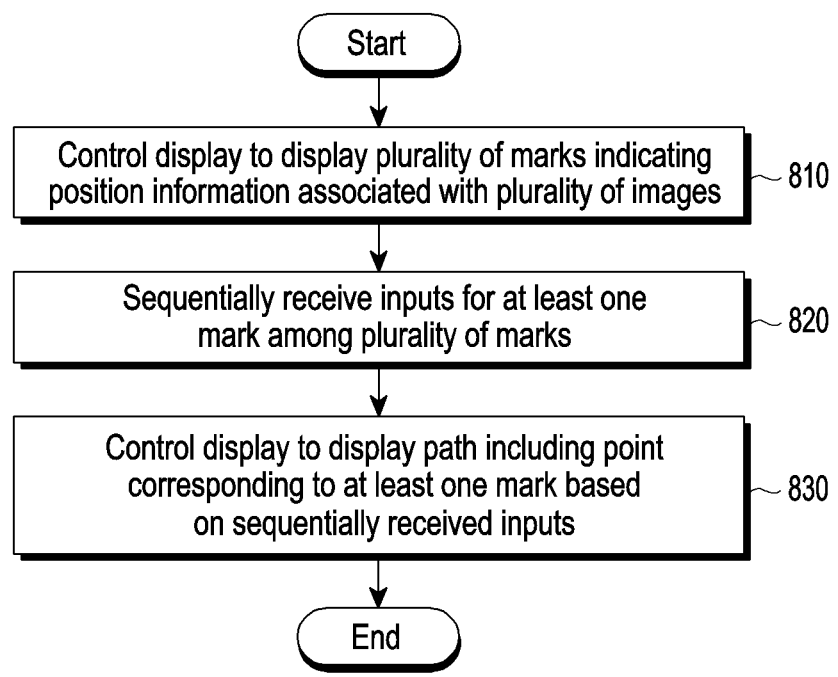
FIG. 8A is a flowchart illustrating a configuration in which an electronic device displays a path including a plurality of points according to an embodiment of the disclosure.
Figure 8B:
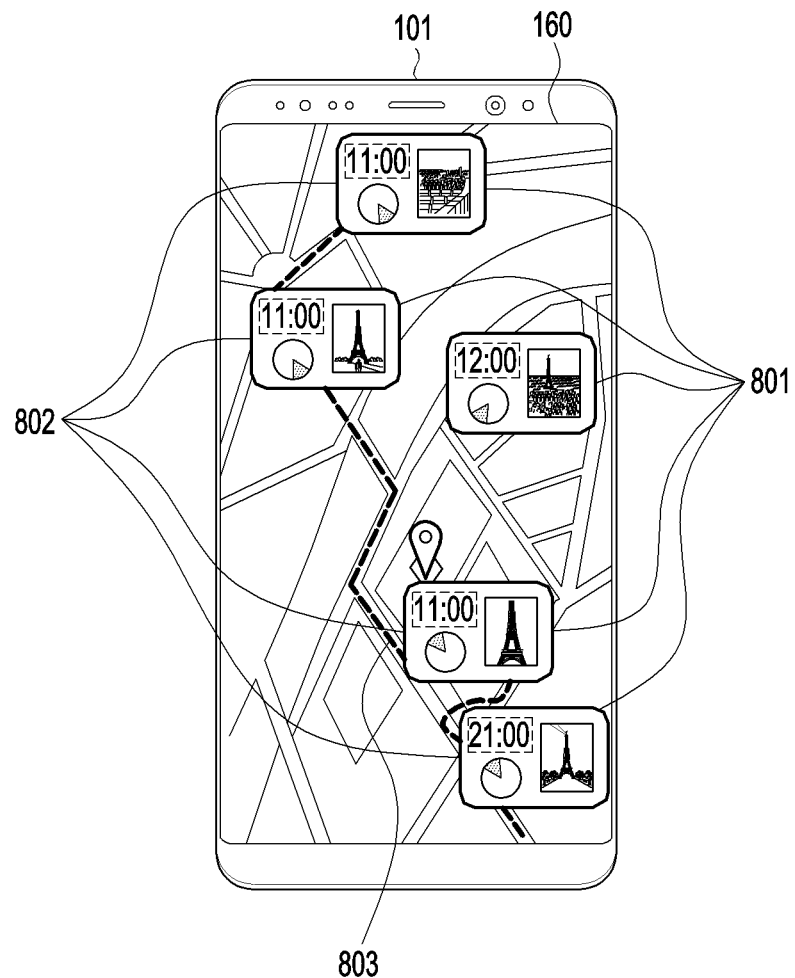
FIG. 8B is a diagram illustrating a configuration in which an electronic device displays a path including a plurality of points according to an embodiment of the disclosure.

FIG. 8A is a flowchart illustrating a configuration in which an electronic device displays a path including a plurality of points according to an embodiment of the disclosure. FIG. 8B is a diagram illustrating a configuration in which an electronic device displays a path including a plurality of points according to an embodiment of the disclosure.

Referring to FIG. 8A, in operation 810, a processor (e.g., the processor 120 of FIG. 1) may control a display to display a plurality of marks indicating position information associated with a plurality of images. Referring to FIG. 8B, the processor 120 may control the display 160 to display first marks 801 indicating positions associated with the plurality of images received from the server 108 using a map application. Information indicating a thumbnail of an image corresponding to each of the first marks 801, a shooting angle, and a shooting time may be displayed on each of the first marks 801.

In operation 820, the processor 120 may sequentially receive an input for at least one mark among the plurality of marks. The user may sequentially input second marks 802 among the first marks 801 when there are a plurality of places to be captured through a touch screen.

In operation 830, the processor 120 may control the display to display a path including a point corresponding to the at least one mark based on sequentially received inputs. The processor 120 may control the display 160 to display a path 803 including the second marks 802 based on the sequentially inputted inputs.

Figure 9:
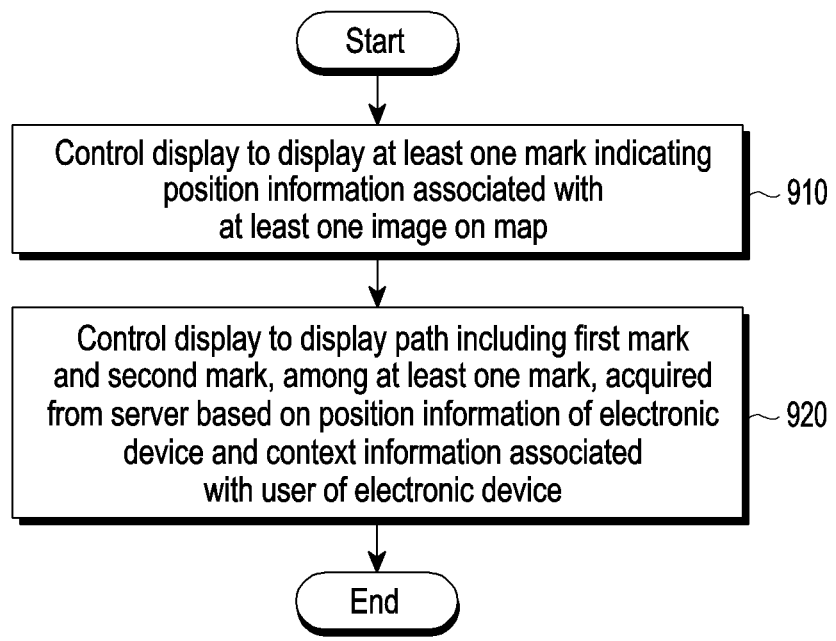
FIG. 9 is a flowchart illustrating a configuration in which an electronic device displays a path including a plurality of points according to an embodiment of the disclosure.

FIG. 9 is a flowchart illustrating a configuration in which an electronic device displays a path including a plurality of points according to an embodiment of the disclosure.

Referring to FIG. 9, in operation 910, a processor (e.g., the processor 120 of FIG. 1) may control the display to display at least one mark indicating position information associated with at least one image on a map. Referring to FIG. 8B, the processor 120 may control the display 160 to display first marks 801 indicating positions associated with a plurality of images received from the server 108 using a map application. Information indicating a thumbnail, shooting angle, and shooting time of an image corresponding to each of the first marks 801 may be displayed on each of the first marks 801.

In operation 920, the processor 120 may control the display to display a path including at least one mark among the plurality of marks based on position information of the electronic device acquired from the server and context information associated with the user of the electronic device. The processor 120 may configure priorities for points corresponding to the plurality of images based on context information corresponding to the plurality of images. For example, when the user's remaining travel itinerary is insufficient, the processor 120 may configure an image corresponding to a point located at a distant position from the current position to have a lower priority. Alternatively, when the current time is in the afternoon or when an appropriate shooting time corresponding to the shooting information of the image is in the morning, the processor 120 may configure the corresponding priority as a lower priority. When it is easy to capture an image because a floating population at a specific point at the current time is small, the processor 120 may configure the priority of the corresponding point as a higher priority. Alternatively, when the current time is within the opening time of a specific point, the processor 120 may configure the priority of the corresponding point as a higher priority. Alternatively, when an event or festival is currently in progress at a specific point, the processor 120 may configure the priority of the corresponding point as a higher priority. The description of the priority configuration is merely exemplary, and does not limit the spirit of the present application.

According to various embodiments, the processor 120 may select the second marks 802 among the first marks 801 based on raw data and context information for a plurality of images, and may configure priorities of the selected second marks 802. The processor 120 may control the display 160 to display priorities of the second marks 802, to acquire the path 803 by connecting the second marks 802 for each priority, and to display the acquired path 803.

Figure 10A:
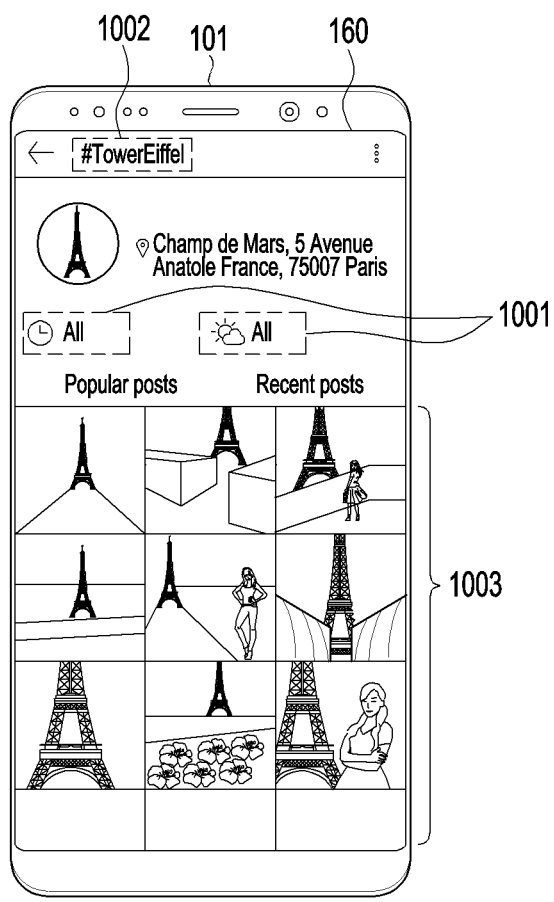
FIG. 10A is a diagram illustrating a configuration in which an electronic device performs filtering on images displayed on a screen of an application according to an embodiment of the disclosure.
Figure 10B:
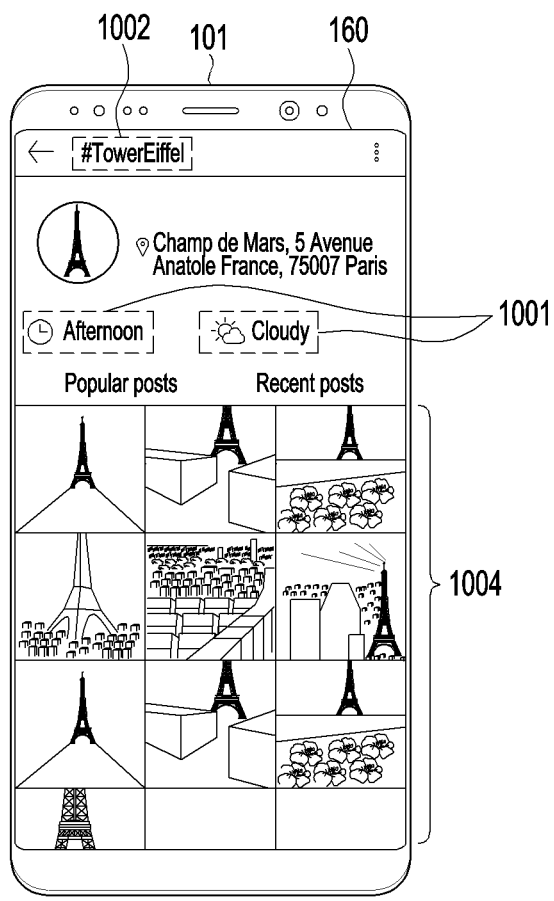
FIG. 10B is a diagram illustrating a configuration in which an electronic device performs filtering on images displayed on a screen of an application according to an embodiment of the disclosure.

FIG. 10A is a diagram illustrating a configuration in which an electronic device performs filtering on images displayed on a screen of an application according to an embodiment of the disclosure. FIG. 10B is a diagram illustrating a configuration in which an electronic device performs filtering on images displayed on a screen of an application according to an embodiment of the disclosure.

Referring to FIG. 10A, the processor 120 of the electronic device 101 may control the display 160 to display an execution screen of a social network service application, and may display images obtained by performing filtering on images displayed on the execution screen of the social network service application. The processor 120 of the electronic device 101 may display a plurality of first images 1003 searched using a search word 1002 of "#TowerEffel" in the social network service application. The plurality of first images 1003 may be images searched without limitation in time and place according to a value configured in a filter 1001.

Referring to FIG. 10B, the processor 120 may control the display 160 to display a plurality of second images 1004 obtained by performing filtering on the plurality of first images 1003 searched using the same search word 1002 of "#TowerEffel". For example, the processor 120 may receive an input for the filter 1001 through a touch screen. For example, the processor 120 may obtain the plurality of second images 1004 composed of images captured in cloudy weather in the afternoon among the plurality of first images 1003 by performing filtering corresponding to "Afternoon" and "Cloudy" on a plurality of first images, and may display the obtained plurality of second images 1004.

Figure 11A:
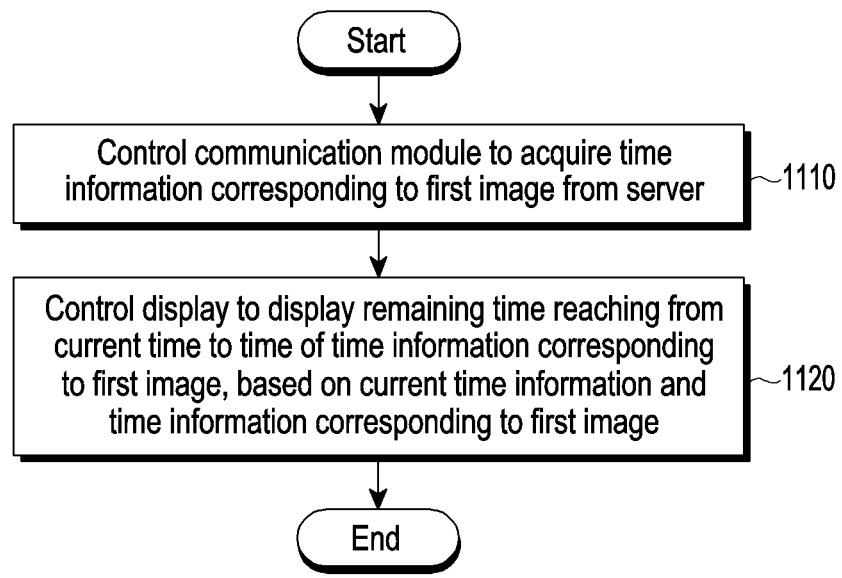
FIG. 11A is a flowchart illustrating a configuration in which an electronic device displays the remaining time based on time information corresponding to a first image according to an embodiment of the disclosure.

FIG. 11A is a flowchart illustrating a configuration in which an electronic device displays the remaining time based on time information corresponding to a first image according to an embodiment of the disclosure.

Referring to FIG. 11A, in operation 1110, a processor (e.g., the processor 120 of FIG. 1) of an electronic device (e.g., the electronic device 101 of FIG. 1) may control a communication module to acquire time information corresponding to a first image from a server (e.g., the server 108 of FIG. 1).

Figure 11B:
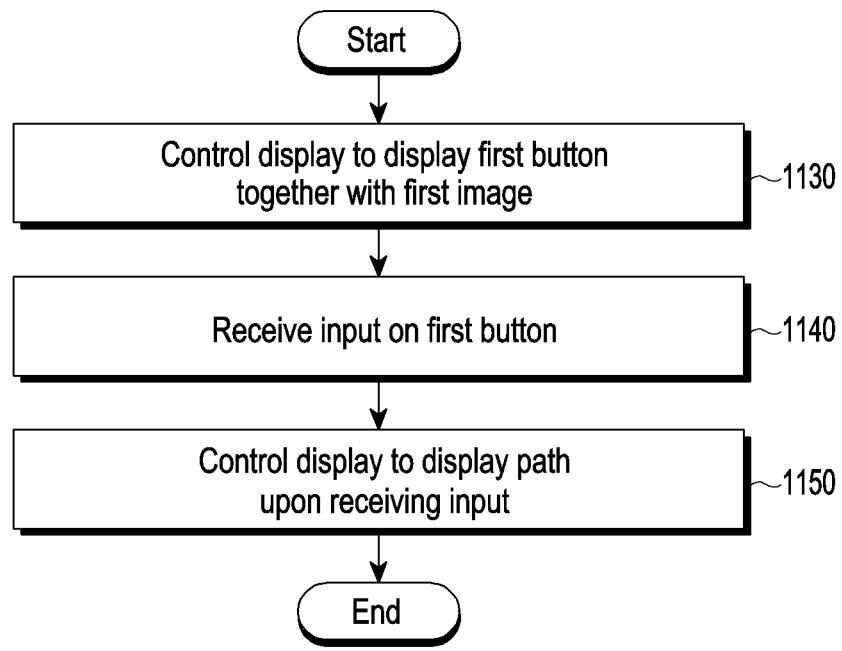
FIG. 11B is a flowchart illustrating a configuration in which an electronic device displays a path corresponding to a first image according to an embodiment of the disclosure.

Referring to FIGS. 11A and 11B, the processor 120 may receive an input for the first image among the plurality of first images 1003 or the plurality of second images 1004 displayed in FIGS. 10A and 10B. The processor 120 may control a communication module (e.g., the communication module 190 of FIG. 1) to receive the first image and information associated with the first image from the server 108. The information associated with the first image may include shooting information obtained on the basis of the above-described raw data and context information associated with the first image. The raw data may include a shooting time, GPS information of an object corresponding to the first image, etc.

Figure 11C:
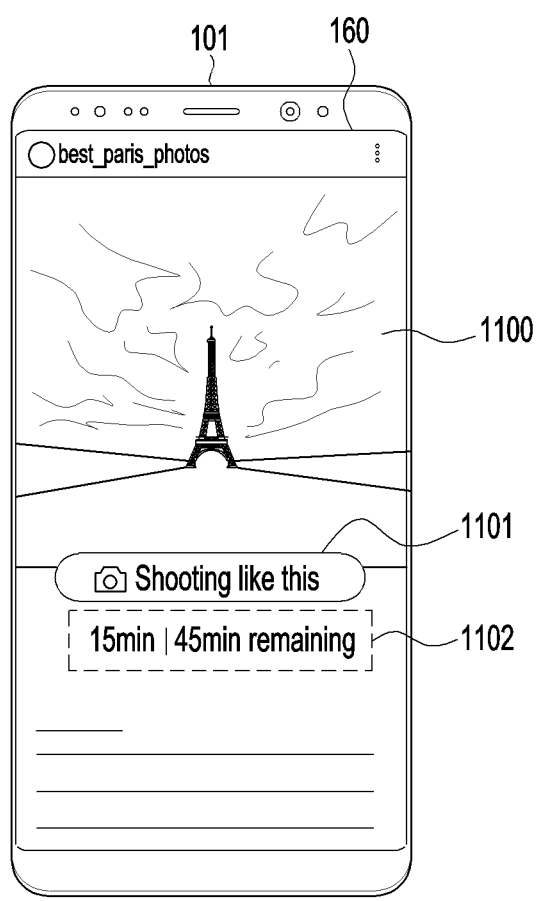
FIG. 11C is a diagram illustrating a configuration in which an electronic device displays the remaining time based on time information corresponding to a first image according to an embodiment of the disclosure.

FIG. 11C is a diagram illustrating a configuration in which an electronic device displays the remaining time based on time information corresponding to a first image according to an embodiment of the disclosure. In operation 1120, the processor 120 may control a display to display the remaining time reaching from a current time to the time of time information corresponding to the first image based on the current time information and the time information corresponding to the first image. Referring to FIG. 11C, the processor 120 of the electronic device 101 may display the first image 1100, a time during which it takes to get to a position for capturing the first image, and a mark 1102 indicating the remaining time reaching from the current time to time information corresponding to the first image.

Figure 11D:
FIG. 11D is a diagram illustrating a configuration in which an electronic device displays a path corresponding to a first image according to an embodiment of the disclosure.

FIG. 11B is a flowchart illustrating a configuration in which an electronic device displays a path corresponding to a first image according to an embodiment of the disclosure. FIG. 11D is a diagram illustrating a configuration in which an electronic device displays a path corresponding to a first image according to an embodiment of the disclosure.

In operation 1130, the processor 120 of the electronic device 101 may control the display 160 to display a first button 1101 together with the first image 1100. Referring to FIG. 11D, the processor 120 may control the display 160 to display the first image 1100 and the first button 1101. In operation 1140, the processor 120 may control a touch screen to receive an input on the first button. In operation 1150, upon receiving the input, the processor 120 may control the display to display a path. When the input on the first button 1101 is received in FIG. 11C, the processor 120 may display a simulation screen showing a path as shown in FIG. 11D. A detailed description of the configuration for showing the path has been described in detail above, and thus will be omitted.

The electronic device 101 according to various embodiments may include the communication module 190, the display 160, and the processor 120, wherein the processor 120 may be configured to: identify position information of the electronic device 101; control the communication module 190 to transmit the position information of the electronic device 101 to the server 108; control the communication module 190 to acquire at least one image identified on the basis of the position information of the electronic device 101 and position information associated with the at least one image from the server 108; control the display 160 to display the at least one image acquired from the server 108; acquire an input for a first image among the at least one image; and display the position information of the electronic device 101 and a path corresponding to position information corresponding to the first image.

In the electronic device 101 according to an embodiment, the processor 120 may be configured to: control the communication module 190 to acquire the at least one image selected on the basis of the position information of the electronic device 101 and context information associated with the user of the electronic device 101 from the server 108.

In the electronic device 101 according to an embodiment, the processor 120 may be configured to: control the communication module 190 to acquire the path selected on the basis of a gyro value of the first image from the server 108; and control the display 160 to display the acquired path.

In the electronic device 101 according to an embodiment, the electronic device may further include: a gyro sensor, and the processor 120 may be configured to: identify whether the position information of the electronic device 101 matches the position information corresponding to the first image; execute a camera application based on the identified result; and control the display 160 to translucently display the first image on an execution screen of the camera application, based on the position information corresponding to the first image and the gyro value acquired using the gyro sensor.

In the electronic device 101 according to an embodiment, the processor 120 may be configured to: control the display 160 to display a simulation screen for a point on a path corresponding to the position information, based on the position information of the electronic device 101.

In the electronic device 101 according to an embodiment, the processor 120 may be configured to: control the display 160 to display a mark showing the path on the simulation screen based on the position information corresponding to the first image.

In the electronic device 101 according to an embodiment, the processor 120 may be configured to: control the display 160 to display at least one mark indicating the position information associated with the at least one image; sequentially receive inputs for a first mark and a second mark among the at least one mark; and control the display 160 to display a path including a point corresponding to the first mark and a point corresponding to the second mark based on the sequentially received inputs.

In the electronic device 101 according to an embodiment, the processor 120 may be configured to: control the display 160 to display at least one mark indicating the position information associated with the at least one image on a map; and control the display 160 to display a path including the first mark and the second mark, among the at least one marks acquired from the server 108 based on the position information of the electronic device 101 and the context information associated with the user of the electronic device 101.

In the electronic device 101 according to an embodiment, the processor 120 may be configured to: control the communication module 190 to acquire time information corresponding to the first image from the server 108; and control the display 160 to display the remaining time from a current time to a time of the time information corresponding to the first image based on current time information and the time information corresponding to the first image.

In the electronic device 101 according to an embodiment, the processor 120 may be configured to: control the display 160 to display a first button together with the first image; receive an input on the first button; and control the display 160 to display the path upon receiving the input.

A method of controlling the electronic device 101 according to various embodiments may include: identifying position information of the electronic device 101; controlling the communication module 190 to transmit the position information of the electronic device 101 to the server 108; controlling the communication module 190 to acquire at least one image identified on the basis of the position information of the electronic device 101 and position information associated with the at least one image from the server 108; controlling the display 160 to display the at least one image acquired from the server 108; acquiring an input for a first image among the at least one image; and controlling the display 160 to display the position information of the electronic device and a path corresponding to position information corresponding to the first image.

The method of controlling the electronic device 101 according to an embodiment may further include: controlling the communication module 190 to acquire the at least one image selected on the basis of the position information of the electronic device 101 and context information associated with the user of the electronic device 101 from the server 108.

The method of controlling the electronic device 101 according to an embodiment may further include: controlling the communication module 190 to acquire the path selected on the basis of a gyro value of the first image from the server 108; and controlling the display 160 to display the acquired path.

The method of controlling the electronic device 101 according to an embodiment may further include: identifying whether the position information of the electronic device 101 matches the position information corresponding to the first image; executing a camera application based on the identified result; and controlling the display 160 to translucently display the first image on an execution screen of the camera application, based on the position information corresponding to the first image and the gyro value acquired using a gyro sensor.

The method of controlling the electronic device 101 according to an embodiment may further include: controlling the display 160 to display a simulation screen for a point on a path corresponding to the position information, based on the position information of the electronic device 101.

The method of controlling the electronic device 101 according to an embodiment may further include: controlling the display 160 to display a mark showing the path on the simulation screen based on the position information corresponding to the first image. The method of controlling the electronic device 101 according to an embodiment may further include: controlling the display 160 to display at least one mark indicating the position information associated with the at least one image; sequentially receiving inputs for a first mark and a second mark among the at least one mark; and controlling the display 160 to display a path including a point corresponding to the first mark and a point corresponding to the second mark based on the sequentially received inputs.

The method of controlling the electronic device 101 according to an embodiment may further include: controlling the display 160 to display at least one mark indicating the position information associated with the at least one image on a map; and controlling the display 160 to display a path including the first mark and the second mark, among the at least one marks acquired from the server 108 based on the position information of the electronic device 101 and the context information associated with the user of the electronic device 101.

The method of controlling the electronic device 101 according to an embodiment may further include: controlling the communication module 190 to acquire time information corresponding to the first image from the server 108; and controlling the display 160 to display the remaining time from a current time to a time of the time information corresponding to the first image based on current time information and the time information corresponding to the first image.

The method of controlling the electronic device 101 according to an embodiment may further include: controlling the display 160 to display a first button together with the first image; receiving an input on the first button; and controlling the display 160 to display the path upon receiving the input.

The server according to an embodiment may acquire position information of an electronic device from the electronic device; acquire at least one image among a plurality of images based on the position information of the electronic device and position information corresponding to the plurality of images; acquire shooting information corresponding to the at least one image based on raw data associated with the at least one image and context information associated with the at least one image; and transmit the acquired shooting information to the electronic device.

The electronic device according to various embodiments may be one of various types of electronic devices. The electronic devices may include, for example, a portable communication device (e.g., a smallphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
a communication module configured to include a circuit;
a gyro sensor:
a camera;
a display;
a processor; and
memory storing instructions that, when executed by the processor, cause the electronic device to:
identify position information of the electronic device,
control the communication module to transmit the position information of the electronic device to a server,
control the communication module to acquire at least one image identified based on the position information of the electronic device and information of at least one position at which the at least one image is captured, from the server,
control the display to display the at least one image acquired from the server,
acquire an input for a first image among the at least one image,
control the display to display a path between a current location of the electronic device based on the position information of the electronic device and a first location where the first image is captured based on the information,
identify whether the current location matches the first location before executing a camera application,
execute the camera application when the current location matches the first location,
after executing the camera application, display the first image on an execution screen of the camera application based on a gyro sensor value obtained through the gyro sensor,
adjust at least one parameter related to the camera application and obtain a second image captured using the camera based on the adjusted at least one parameter and based on displaying the first image on the execution screen of the camera application, wherein the second image is captured based on at least one of a size, a brightness, a composition, a contrast or a filter value related to the first image, and control the display to display the path continuously without executing the camera application when the current location does not match the first location.

2. The electronic device of claim 1, wherein the instructions, when executed by the processor, cause the electronic device to:
control the communication module to acquire the at least one image selected based on the position information of the electronic device and context information associated with a user of the electronic device from the server.

3. The electronic device of claim 1, wherein the instructions, when executed by the processor, cause the electronic device to:
control the communication module to acquire the path selected based on a gyro value of the first image from the server; and
control the display to display the acquired path.

4. The electronic device of claim 3, further comprising:
a gyro sensor,
wherein the instructions, when executed by the processor, cause the electronic device to:
when the camera application is executed, control the display to translucently display the first image on an execution screen of the camera application, based on the first location corresponding to the first image and the gyro value acquired using the gyro sensor.

5. The electronic device of claim 1, wherein the instructions, when executed by the processor, cause the electronic device to:
control the display to display a simulation screen for a point on a path corresponding to the information, based on the position information of the electronic device.

6. The electronic device of claim 5, wherein the instructions, when executed by the processor, cause the electronic device to:
control the display to display a mark showing the path on the simulation screen based on the information.

7. The electronic device of claim 1, wherein the instructions, when executed by the processor, cause the electronic device to:
control the display to display at least one mark indicating the information associated with the at least one image;
sequentially receive inputs for a first mark and a second mark among the at least one mark; and
control the display to display a path including a point corresponding to the first mark and a point corresponding to the second mark based on the sequentially received inputs.

8. The electronic device of claim 3, wherein the instructions, when executed by the processor, cause the electronic device to:
control the display to display at least one mark indicating the information associated with the at least one image on a map; and
control the display to display a path including a first mark and a second mark, among the at least one mark acquired from the server based on the position information of the electronic device and context information associated with a user of the electronic device.

9. The electronic device of claim 1, wherein the instructions, when executed by the processor, cause the electronic device to:
control the communication module to acquire time information corresponding to the first image from the server; and
control the display to display a remaining time from a current time to a time of the time information corresponding to the first image based on current time information and the time information corresponding to the first image.

10. The electronic device of claim 1, wherein the instructions, when executed by the processor, cause the electronic device to:
control the display to display a first button together with the first image;
receive an input on the first button; and
control the display to display the path upon receiving the input.

11. A method of controlling an electronic device, the method comprising:
identifying position information of the electronic device;
controlling a communication module to transmit the position information of the electronic device to a server;
controlling the communication module to acquire at least one image identified based on the position information of the electronic device and information of at least one position at which the at least one image is captured, from the server;
controlling a display to display the at least one image acquired from the server;
acquiring an input for a first image among the at least one image;
controlling the display to display a path between a current location of the electronic device based on the position information of the electronic device and a first location where the first image is captured based on the information;
identifying whether the current location matches the first location before executing a camera application;
executing the camera application when the current location matches the first location;
after executing the camera application, displaying the first image on an execution screen of the camera application based on a gyro sensor value obtained through a gyro sensor of the electronic device,
adjusting at least one parameter related to the camera application and obtaining a second image captured using a camera of the electronic device based on the adjusted at least one parameter and based on displaying the first image on the execution screen of the camera application, wherein the second image is captured based on at least one of a size, a brightness, a composition, a contrast or a filter value related to the first image; and
controlling the display to display the path continuously without executing the camera application when the current location does not match the first location.

12. The method of claim 11, further comprising:
controlling the communication module to acquire the at least one image selected based on the position information of the electronic device and context information associated with a user of the electronic device from the server.

13. The method of claim 11, further comprising:
controlling the communication module to acquire the path selected based on a gyro value of the first image from the server; and
controlling the display to display the acquired path.

14. The method of claim 13, further comprising:
when the camera application is executed, controlling the display to translucently display the first image on an execution screen of the camera application, based on the first location corresponding to the first image and the gyro value acquired using a gyro sensor.

15. The method of claim 14, further comprising:
controlling the display to display a mark showing the path on a simulation screen based on the information corresponding to the first image.

\* \* \* \* \*